(12) United States Patent
Wang et al.

(10) Patent No.: US 11,074,443 B2
(45) Date of Patent: Jul. 27, 2021

(54) METHOD AND DEVICE FOR ACQUIRING SLANT VALUE OF SLANT IMAGE, TERMINAL AND STORAGE MEDIUM

(71) Applicant: Ping An Technology (Shenzhen) Co., Ltd., Guangdong (CN)

(72) Inventors: Jianzong Wang, Guangdong (CN); Chenyu Wang, Guangdong (CN); Jin Ma, Guangdong (CN); Jing Xiao, Guangdong (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 461 days.

(21) Appl. No.: 16/090,198

(22) PCT Filed: Aug. 30, 2017

(86) PCT No.: PCT/CN2017/099644
§ 371 (c)(1),
(2) Date: Sep. 28, 2018

(87) PCT Pub. No.: WO2019/019250
PCT Pub. Date: Jan. 31, 2019

(65) Prior Publication Data
US 2021/0124918 A1 Apr. 29, 2021

(30) Foreign Application Priority Data
Jul. 28, 2017 (CN) .......................... 201710630855.6

(51) Int. Cl.
*G06K 9/00* (2006.01)
*G06T 7/12* (2017.01)
(Continued)

(52) U.S. Cl.
CPC ....... *G06K 9/00463* (2013.01); *G06K 9/3283* (2013.01); *G06K 9/38* (2013.01);
(Continued)

(58) Field of Classification Search
CPC .... G06K 9/00463; G06K 9/38; G06K 9/3283; G06K 9/4633; G06K 2209/01;
(Continued)

(56) References Cited

U.S. PATENT DOCUMENTS 5,937,084 A * 8/1999 Crabtree ............. G06K 9/2054
382/137
6,310,984 B2 * 10/2001 Sansom-Wai ........ H04N 1/3873
382/289
(Continued)

FOREIGN PATENT DOCUMENTS

CN 101408937 A 4/2009
CN 101425142 A 5/2009
(Continued)

*Primary Examiner* — Nancy Bitar

(57) ABSTRACT

A method, a device, a terminal and a storage medium for acquiring slant value of slant image are provided. The method for acquiring slant value of a slant image comprises: analyzing the slant image and acquiring coordinate information of a plurality of boundary lines of the slant image; acquiring first slant values of the boundary lines by analysing and calculating the coordinate information; acquiring a correction value; calculating difference values between the first slant values and the correction value respectively; determining the first slant value corresponding to the minimum difference value as the slant value of the slant image. The technical solution of the present disclosure can uniquely determine a slant value of slant image.

10 Claims, 5 Drawing Sheets

(51) Int. Cl.
*G06K 9/38* (2006.01)
*G06K 9/46* (2006.01)
*G06T 7/60* (2017.01)
*G06T 7/11* (2017.01)
*G06K 9/32* (2006.01)

(52) U.S. Cl.
CPC .............. *G06K 9/4633* (2013.01); *G06T 7/11* (2017.01); *G06T 7/12* (2017.01); *G06T 7/60* (2013.01); *G06K 2209/01* (2013.01); *G06T 2207/10004* (2013.01); *G06T 2207/30176* (2013.01)

(58) Field of Classification Search
CPC ...... G06K 9/00442; G06K 9/344; G06T 7/60; G06T 7/12; G06T 7/11; G06T 2207/30176; G06T 2207/10004; G06F 17/145
See application file for complete search history.

(56) References Cited

U.S. PATENT DOCUMENTS

| | | | |
|---|---|---|---|
| 6,373,997 B1 * | 4/2002 | Wayner | G06K 9/3283 382/289 |
| 6,415,064 B1 * | 7/2002 | Oh | G06K 9/3283 382/289 |
| 2013/0259385 A1 | 10/2013 | Xie et al. | |

FOREIGN PATENT DOCUMENTS

| | | |
|---|---|---|
| CN | 103366165 A | 10/2013 |
| CN | 105608455 A | 5/2016 |
| CN | 106131362 A | 11/2016 |
| JP | 4136819 B2 | 8/2008 |

* cited by examiner

METHOD AND DEVICE FOR ACQUIRING SLANT VALUE OF SLANT IMAGE, TERMINAL AND STORAGE MEDIUM

FIELD OF THE INVENTION

The present application relates to image processing filed, especially to a method and a device for acquiring slant value of a slant image, a terminal and a storage medium.

BACKGROUND

Currently, in order to acquire a slant value while a rectangle image is slanted, a Hough line segment detection algorithm is adopted to detect and extract boundary lines of the image; however, a rectangle image includes boundary lines along the length and width directions, further to that, boundaries of some rectangle images are unclear, which makes a plurality of line segments extracted from a same boundary line and the background of the rectangle image impure with disruptive line segment(s). In this way, the Hough line segment detection algorithm will detect many boundary lines. Slant values may be different for different boundary lines. Even the slant values of a plurality of line segments extracted from the same boundary of a rectangle image can be different from each other, such that the slant value of the image cannot be uniquely determined.

SUMMARY

In order to deal with the problem that the slant value of the image cannot be uniquely determined, a method and a device for acquiring slant value of a slant image, a terminal and a storage medium are provided.

Firstly, a method for acquiring slant value of a slant image is provided, wherein the slant image is a rectangle, the method for acquiring slant value comprises:

analyzing the slant image and acquiring coordinate information of a plurality boundary lines of the slant image;

acquiring first slant values of the boundary lines based on the coordinate information;

acquiring a correction value;

calculating the difference values between the first slant value and the correction value respectively;

determining the first slant value corresponding to the smallest difference value as the slant value of the slant image.

Secondly, a device for acquiring slant value of a slant image is provided, wherein the slant image is a rectangle, the device for acquiring slant value comprises:

an analysis module configured to analyze the slant image and acquire coordinate information of a plurality of boundary lines of the slant image;

a first slant value acquisition module configured to analyze and calculate each coordinate information respectively and acquire first slant values of each of the boundary lines;

a correction value acquisition module configured to acquire a correction value;

a difference value calculating module configured to calculate difference values between the first slant value and the correction value respectively;

a determining module configured to determine the first slant value corresponding to the smallest difference value as the slant value of the slant image.

Thirdly, some embodiments of the present application provide a terminal including a processor, a storage device and computer program stored in the storage device and executable on the processor, wherein the processor executes the computer program to perform the method for acquiring slant value of a slant image described above.

Fourthly, some embodiments of the present application provide a computer-readable storage medium comprising computer program, wherein the computer program is executed by a processor to perform the method for acquiring slant value of a slant image described above.

The present disclosure provides a method and a device for acquiring slant value of a slant image, a terminal and a storage medium. By obtaining the correction value, the first slant value of each extracted boundary line is compared with the correction value one by one. Finally, the first slant value corresponding to the minimum difference value is determined as the slant value of the slant image, so that the slant value of the slant image is uniquely determined.

BRIEF DESCRIPTION OF THE DRAWINGS

In order to illustrate the technical solutions of the embodiments of the present application more clearly, the drawings described along with the description of the embodiments will be briefly described as follows. It is obvious that the drawings are only some embodiments of the present application. Alternative drawings may also be obtained from those of ordinary skill in the art based on these drawings without the creative works.

DETAILED DESCRIPTION OF EMBODIMENT

In order to make the technical problem, solutions and beneficial effects of the present application clearer, the embodiments will be described below in further details in accompany with the drawings. It should be understood that, specific embodiments described herein are merely for explaining instead of limiting the present application.

Figure 1:
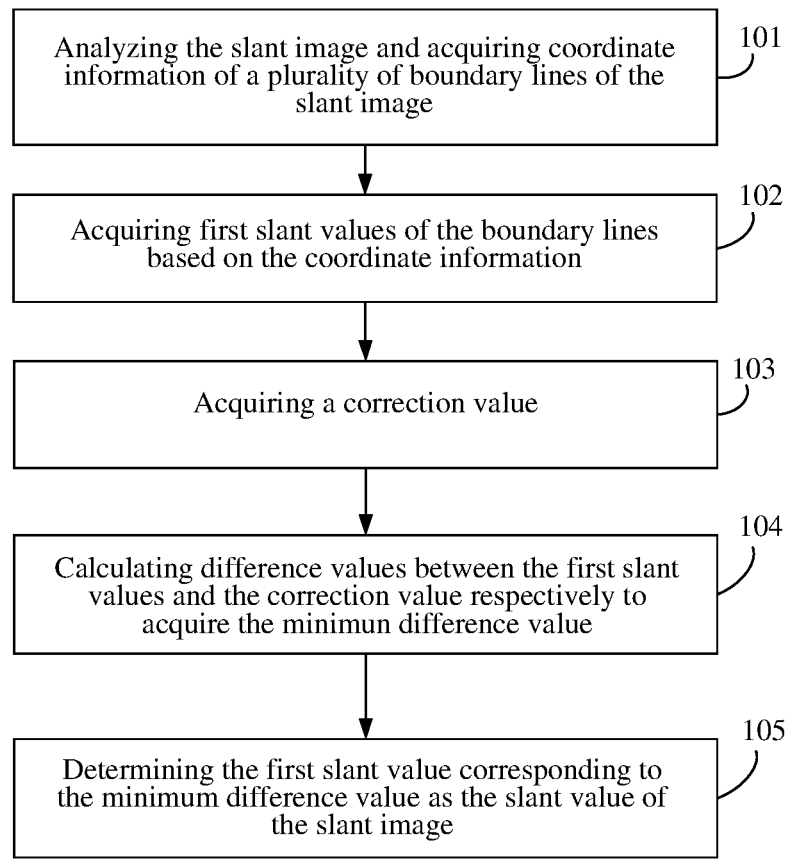
FIG. 1 illustrates a flow chart of a method for acquiring slant value of a slant image according to the first embodiment of the present application.

FIG. 1 illustrates a flow chart of a method for acquiring slant value of a slant image according to the first embodiment of the present application. The method includes:

Step 101, analyze the slant image and acquiring coordinate information of a plurality of boundary lines of the slant image.

The step 101 specifically includes: performing binarization to the slant image to acquire a binary image, i.e., a monochrome image; detecting the binary image based on Hough line segment detection algorithm to acquire the coordinate information of the plurality of boundary lines. The coordinate information can be slopes and intercepts of the boundary lines in a rectangular plane coordinate system (x, y), alternatively, can be coordinate value of a point in a parameter plane (k, b) corresponding to each of the boundary lines.

Binarization performed to the slant image refers to assigning gray values of pixel points in the slant image to a first value and a second value, which makes the whole slant image presents a distinct black and white visual effect. Binarization performed to the slant image includes a bimodal method, an iterative method, a P-parameter method, etc. Other binarization(s) can be adopted in addition to the above binarization processing methods, which will not be listed in the present embodiment. Detailed steps for the binarization can be found in related technologies, which would not be described in further detail herein. It should be noted that the first value and the second value may be set in advance, and the first value is greater than the second value. For example, the first value can be 255, 254, 253 or the like, the second value can be 0, 1, 2 or the like. In order to acquire the profile of the to-be-detected straight line (i.e., the boundary line) in the slant image more precisely, so as to improve straight line detection accuracy, the first value may be 255 and the second value may be 0, which would not be limited specifically in the present embodiment.

Before detecting the binary image based on the Hough line segment detection algorithm, gray values of each of the pixel points in the binary image are acquired, and the pixel points with gray values of the first value in the binary image area are selected based on the gray values of each of the pixel points, so that the coordinates of the selected pixel points are determined.

In the rectangular plane coordinate system (x, y), a straight line may be represented by the equation of y=kx+b. For a give point $(x_0, y_0)$ in the straight line, $y_0=kx_0+b$ represents a straight line in the parameter plane (k, b). Therefore, one pixel point in the binary image corresponds to a straight line in its parameter plane; Therefore, in this step, all the pixels whose gray value is the first value on the binary image can be Hough transformed, and the line corresponding to each pixel point in the parameter plane is obtained; and the coordinates of the intersecting points of the plurality of straight lines in the parameter plane is determined and the numbers of the intersecting straight lines corresponding to the intersecting points are calculated; the intersecting point whose number of intersecting straight lines exceeds the predetermined number is determined as the point at which each boundary line corresponds to the parameter plane; and the coordinate information of the intersecting point is determined as the coordinate information of the boundary point. Specifically, the coordinate (k, b) of the intersecting point represents the slope and the intercept of a boundary line.

Step 102, acquire first slant values of the boundary lines based on the coordinate information. A first slant value may be slant angle or slope. Specifically, if the first slant value is slope, then slope of each of the boundary lines is extracted from the coordinate information of each of the boundary lines; if the first slant value is slant angle, then the slope K of each of the boundary lines is extracted from the coordinate information of each of the boundary lines, and the slope K is calculated to acquire the slant angle arctank.

Step 103, acquire a correction value. The correction value is configured to filter and screen the extracted first slant value of each of the boundary lines so as to acquire a unique slant value of the slant image. There are many ways to acquire the correction value.

The first way, if the slant image is a rectangle, the acquired first slant values can be clustered, so as to obtain two clusters, the variance of each cluster is less than the predetermined variance value; then calculating the lengths of the corresponding line segments of each first slant value in each clusters separately; determining the maximum or minimum of the sum of the two lengths obtained above, and using the mean of the cluster corresponding to the maximum or minimum as the correction value. Generally, two kinds of boundary lines are extracted: one is a boundary line that is substantially parallel to the length direction of the slant image; another one is a boundary line that is roughly parallel to the width direction; and the sum of the lengths of all the boundary lines which are substantially parallel to the length direction is greater than the sum of the widths of all the boundary lines which are substantially parallel to the width direction. Therefore, by determining the mean value of the cluster corresponding to the maximum or minimum value as the correction value, the linear direction corresponding to the correction values can be determined, the linear direction is substantially parallel to the length or width direction of the slant image.

If the mean value of the cluster corresponding to the maximum value is determined as the correction value, then the slant direction corresponding to the slant value acquired in step 105 is the length direction of the slant image; if the mean value of the cluster corresponding to the minimum value is determined as the correction value, then the slant direction corresponding to the slant value acquired in step 105 is the width direction of the slant image.

The second way, if the slant image includes a plurality of elements arranged sequentially, and the sorting direction of the plurality of elements is the same as the length direction or the width direction of the slant rectangle image, the slant image may be analysed, and a plurality of element regions are extracted, wherein the element regions are those containing a single element in the slant image; determining two adjacent element regions; acquiring all of the second slant values that are the ones of straight lines connecting two adjacent element regions; analyzing and calculating all the second slant values to acquire the correction value.

Method for acquiring the correction value by the second way will be described in details below, and therefore will not be described herein.

Figure 3:
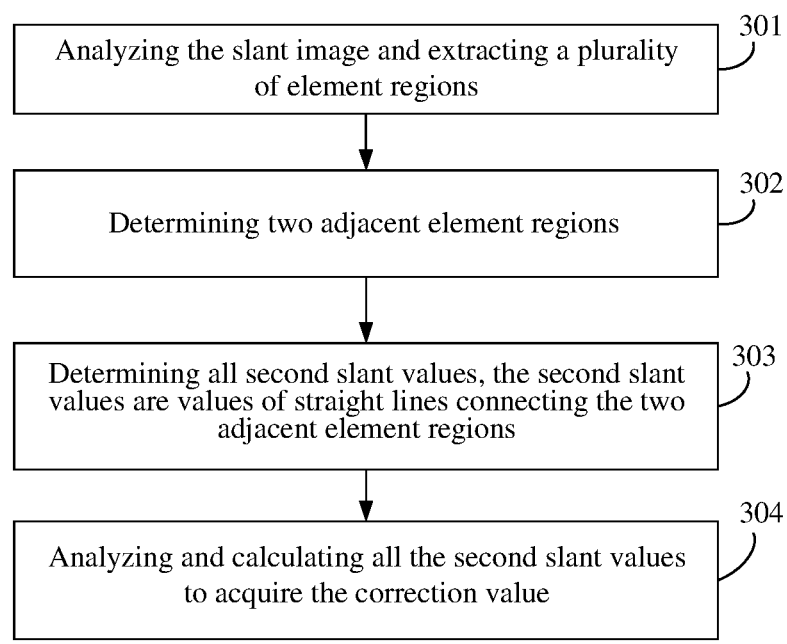
FIG. 3 illustrates a flow chart of a method for acquiring the correction value according to an embodiment of the present application.

The third way, analyzing the slant image to extract a plurality of character regions where the slant image is an ID card photograph and includes a plurality of characters, wherein the character region refers to an affine invariant region containing the characters; determining all two adjacent character regions, wherein the distance between the two adjacent character regions is smaller than a predetermined distance value; and the predetermined distance value is smaller than or equal to minimal line spacing between characters; acquiring all the second slant values which are slant values of the straight lines connecting two adjacent character regions; calculating mean value of all the second slant values to acquire the correction value. Because the column spacing between the character strings corresponding to the address information and number information on the ID card is smaller than the minimal line spacing of the characters on the ID card, the straight line connecting any two adjacent character regions is substantially parallel to the length direction of the slant image, so that the slant direction corresponding to the correction value is the length direction of the slant image. The method for analyzing the slant image, extracting a plurality of character regions is the same as the method for analyzing the slant image and extracting a plurality of element regions as described in the embodiment as illustrated in FIG. 3, which would be further described in details.

The fourth way, analyzing the ID card photograph and extracting all single-character regions wherein the slant image is an ID card photograph, wherein the single-character region is an affine invariant region containing a single character; grouping all the single-character regions to form a plurality of single-character region groups, wherein distance between any two adjacent single-character regions in a single-character region group is smaller than the first predetermined threshold; acquiring the single-character region group with the greatest length; acquiring slant value of the line segment connecting the first single-character region and the last single-character region in the single-character region group with the greatest length, and determining the slant value of the line segment as the correction value.

Step 104, calculate difference values between the first slant values and the correction value respectively to acquire a minimum difference value.

Step 105, determine the first slant value corresponding to the minimum difference value as the slant value of the slant image.

The present embodiment acquires the correction value and has the first slant values of each of the boundary lines compared with the correction value one by one, and determines the first slant value corresponding to the minimum difference value as the slant value of the slant image, thus determining a unique slant value of the slant image.

Figure 2:
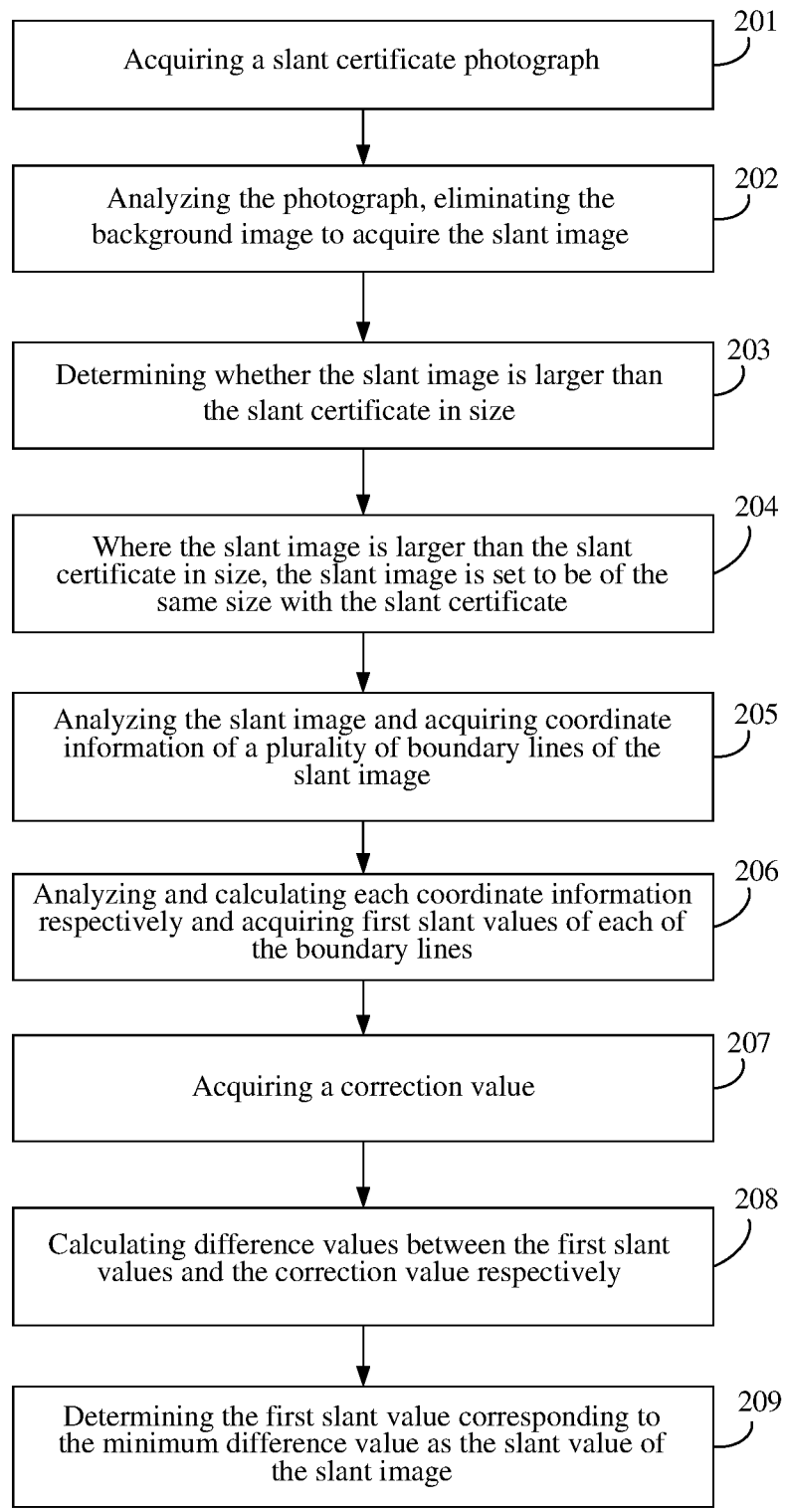
FIG. 2 illustrates a flow chart of a method for acquiring slant value of a slant image according to the second embodiment of the present application.

FIG. 2 illustrates a flow chart of a method for acquiring slant value of a slant image according to the second embodiment of the present application. In the present embodiment, the slant image is a slant certificate photograph. The method includes:

Step 201, acquire a slant certificate photograph, wherein the photograph includes a background image and a slant image. The slant certificate may be an ID card, a social security card, a bank card or the like.

Step 202, analyze the photograph, eliminate the background image to acquire the slant image. Specifically, acquire feature information of a predetermined slant image, which feature information includes a shape feature or a color and light feature; search an image region matched with the feature information in the photograph; eliminate the region (i.e., background image) other than the image region from the photograph so as to acquire the slant image.

Step 203, determining whether the slant image is larger than the slant certificate image in size.

Step 204, where the slant image is larger than the slant certificate image in size, set the slant image to be of the same size with the slant certificate image. Where the slant image is smaller than or equal to the slant certificate image in size, maintain the size of the slant image.

Step 205, analyze the slant image, acquire coordinate information of a plurality of boundary lines of the slant image. The step specifically includes: performing binarization to the slant image to acquire a binary image; detecting the binary image based on Hough line segment detection algorithm to acquire the coordinate information of the plurality of boundary lines. Wherein the coordinate information may be coordinate information of two end points of each of the boundary lines.

Step 206, analyze and calculate each coordinate information respectively to acquire first slant values of each of the boundary lines. The first slant value may be slant angle or slope.

Step 207, acquire a correction value. Methods for acquiring the correction value have been described above, and will not be further described.

Step 208, calculate difference values between each first slant value and the correction value respectively.

Step 209, determine the first slant value corresponding to the minimum difference value as the slant value of the slant image.

Because the slant image is acquired from the photograph of the slant certificate, the size of the slant image may be different from the size of the slant certificate. In the process of extracting the boundary lines, the larger the size of the slant image, the less easily the boundary lines are extracted. In the embodiment of the present invention, if the size of the slant image is larger than the size of the slant certificate image, the size of the slant image is set to be the size of the slant certificate image, so as to ensure that the slant image is not oversized, thereby the extraction of boundary lines would not be affected.

FIG. 3 illustrates a flow chart of a method for acquiring the correction value according to an embodiment of the present application. The second way for acquiring the correction value will be described in the embodiment in details. Wherein the slant image includes a plurality of elements arranged sequentially, and the sequential direction of the elements is the same as the length direction or width direction of the slant image. The method for acquiring the correction value includes:

Step 301, analyze the slant image and extract a plurality of element regions, wherein the element regions are affine invariant regions containing a character respectively. Step 301 includes:

Step 301a, analyze the slant image and extract all maximally stable extremal regions. The maximally stable extremal regions refer to the most stable regions acquired by using different gray threshold to binarize the slant image. Specifically, the step includes: acquiring gray thresholds of the predetermined number; binarizing the slant image using each of the gray thresholds to acquire binary images corresponding to each of the gray thresholds; acquiring a region with a stable shape through each of the binary images corresponding to the predetermined gray threshold range to acquire the maximally stable extremal regions.

Step 301b, determine rectangular boundaries of each of the maximally stable extremal regions. Specifically, the step includes: determining the contour of the maximally stable extremal regions; acquiring the minimum bounding rectangles of the contour based on the determined contour so as to obtain the rectangular boundaries of the maximally stable extremal regions. Wherein, the minimum bounding rectangle refers to the maximum range of a two-dimensional shape in a two-dimensional coordinate, that is, the bounding rectangle is determined with the greatest horizontal coordinate, the smallest horizontal coordinate, the greatest vertical coordinate and the smallest horizontal coordinate of each of the vertexes of the two-dimensional shape.

Step 301c, filter out the non-element regions from all the maximally stable extreme regions to acquire a plurality of element regions; wherein the non-element regions are specifically the maximally stable extreme regions corresponding to the first rectangular boundary; and the element regions are regions containing a single element. The extracted maximally stable extremal regions include a plurality of non-element regions, which should be filtered out to avoid interference with the implementation of the subsequent steps, which might result in excessive error of the acquired correction value. Because each of the maximally stable extremal regions is of an irregular shape, which is inconvenient for calculating the central point or filtering out the non-element regions, it is necessary to determine a bounding rectangle for each maximally stable extremal region so as to calculate the central points of the element regions.

Wherein, step 301c includes specifically: detecting whether a first rectangular boundary exists. The first rectangular boundary refers to the ones inside another rectangular boundary, the ones whose areas are greater than the second predetermined threshold or the ones whose length-width ratios are greater than the third predetermined threshold; filtering out the maximally stable extremal region(s) corresponding to the first rectangular boundary if it is detected that there is a first rectangular boundary. If the slant image is an ID card photograph, the second predetermined threshold is a quarter of the area of the slant image; if the element is a character, then the third predetermined threshold may be 1.5.

Step 302, determine two adjacent element regions. Specifically, acquiring distance between two element regions; judging whether the distance is smaller than the third predetermined threshold; if yes, determining the two element regions as two adjacent element regions. As a first embodiment, the distance between two element regions may be the distance between the central points of the two element regions. As a second embodiment, the distance between two element regions may be horizontal distance and/or vertical distance between the two element regions in the predetermined coordinate system. Where a plurality of elements in an image are arranged in multiple rows and columns, the third predetermined threshold is twice smaller than the element row spacing or column spacing; or the third predetermined threshold is twice smaller than element row spacing, and column spacing. The determined two adjacent element regions include the two element regions adjacent in the element sorting direction, and/or the two element regions adjacent in the vertical direction. Wherein, the vertical direction is a direction perpendicular to the order in which the elements are sorted. The number of linear directions connecting the two adjacent element regions (hereinafter referred to as adjacent direction) depends on the row spacing, the column spacing of the elements, and the third predetermined threshold.

Step 303, acquire all second slant values, the second slant values are the ones of straight lines connecting two adjacent element regions. Distance between the two adjacent element regions is smaller than the predetermined distance. The predetermined distance may be set according to actual needs. In the present embodiment, the predetermined distance should be twice smaller than the row spacing or column spacing of the element.

Step 304, analyze and calculate all the second slant values to acquire the correction value. The step includes: step 304a, clustering all the second slant values to acquire a plurality of slant value clusters; step 304b, acquiring the slant value cluster with the largest weight (i.e., the slant value cluster with the largest number of slant values); step 304c, calculating the mean value of the slant value cluster with the largest weight to acquire the correction value. Because the two adjacent element regions determined in step 302 include the element region(s) adjacent in the length direction of the slant image and the element region(s) adjacent in the width direction of the slant image, the correction value can be uniquely determined by clustering, and using the mean value of the slant value cluster with the largest weight as the correction value. The step 304a includes specifically: acquiring a predetermined number; clustering all third slant values to acquire the predetermined number of slant value clusters; calculating the variances of each slant value clusters to acquire a minimum variance; determining whether the minimum variance is smaller than the first predetermined threshold; if the minimum variance value is greater than or equal to the first preset threshold, updating the predetermined number, and re-performing the step of clustering all third slant values to acquire the predetermined number of slant value clusters until the minimum variance is smaller than the first predetermined threshold. The predetermined quantity is usually 2, and the step of updating the predetermined num is adding 1 to the current predetermined number value, to obtain a new value, and assigning the new value to the predetermined number. Where the slant image is an ID card photograph, the first predetermined value is 200.

Figure 4:
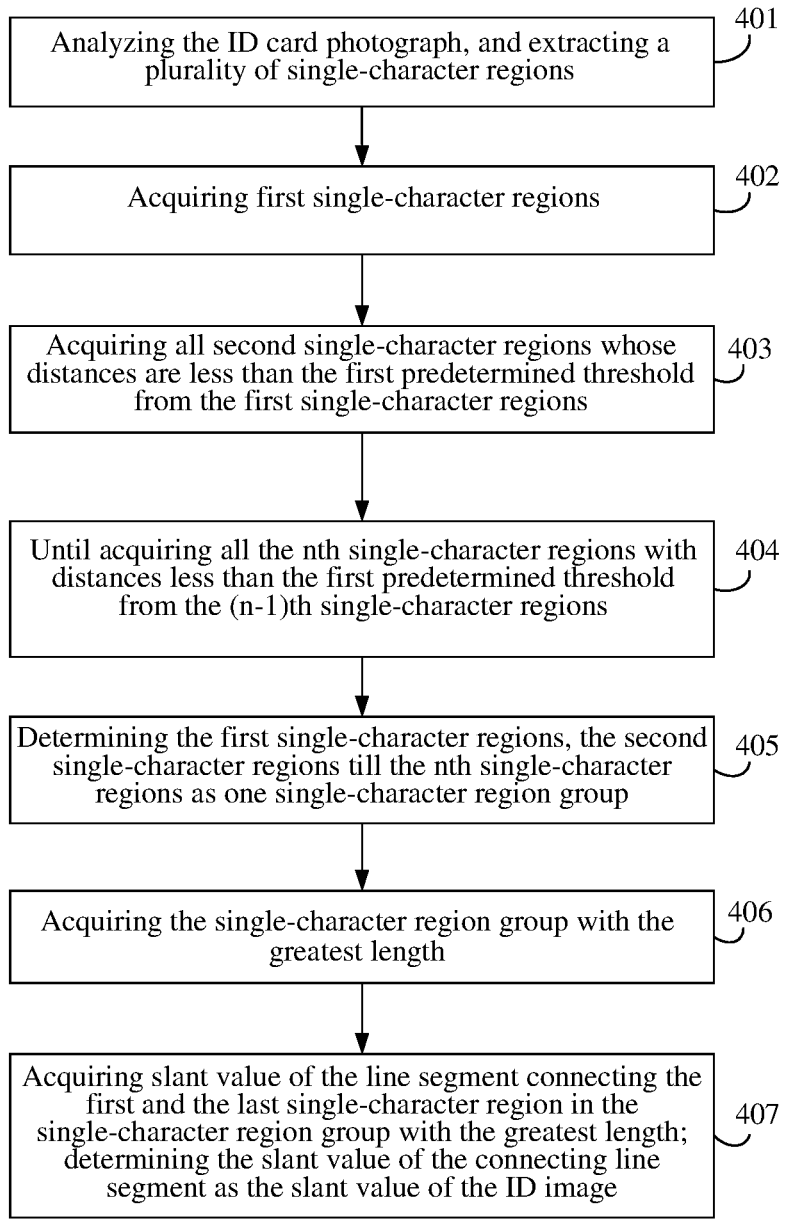
FIG. 4 illustrates a flow chart of a method for acquiring the correction value according to an embodiment of the present application.

Specifically, the step of clustering all the slant values to acquire the predetermined number of slant value clusters includes: selecting a predetermined number of slant values randomly from all the slant value as initial clustering centers; For the remaining slant values, according to their similarity with these initial clustering centers (i.e., distance from the initial clustering center), they are assigned to the clusters represented by the initial clustering centers that are most similar to them, FIG. 4 illustrates a flow chart of a method for acquiring the correction value according to an embodiment of the present application. The fourth way for acquiring the correction value will be described in the embodiment in details.

Step 401, analyze the ID card photograph, and extract a plurality of single-character regions. The ID card photograph includes a plurality of lines of characters arranged sequentially, the characters are texts or numbers. The single-character region is an affine invariant region containing a single character. Specifically, all affine invariant regions can be extracted from the ID card photograph based on the region feature extraction algorithm, and the non-single-character regions (i.e., the affine invariant regions without any features of single character) can be eliminated, so as to acquire the single-character regions.

Step 402, acquire first single-character regions. For the first acquired single-character region group, the first single-character regions may be selected randomly from all the extracted single-character regions; for a single-character region group that is not acquired for the first time, the first single-character region needs to be selected randomly from the remaining single-character regions. Wherein, the remaining single-character regions refer to a plurality of single-character regions acquired from all the single-character regions after eliminating the acquired single-character region group(s).

Step 403, acquire all second single-character regions whose distances are less than the first predetermined threshold from the first single-character region. Wherein, the distance between any two adjacent single-character regions in a single-character region group is smaller than the first predetermined threshold. Further, in order to divide all the single-character regions in the same line of the ID card photograph into the sane group as possible, the distance between any single-character region in any single-character region group and any single-character region in another single-character region group is greater than or equal to the first predetermined threshold. The first predetermined threshold has been described in detail above, and therefore will not be described here.

For single-character regions in the same line, the single-character region in the middle usually has at least two single-character regions with a distance smaller than the first predetermined threshold. Therefore, in order to acquire all the single-character regions in the same line, it is necessary to acquire all second single-character regions.

Step 404, until acquiring all the nth single-character regions whose distances are less than the first predetermined threshold from the (n−1)th single-character regions. This step can be understood as to sequentially take the newly acquired single-character region as base, to acquire all the single-character regions whose distances are less than the first predetermined threshold from the base, until the nth single-character region. Wherein, n is greater than or equal to 2. In order avoid acquiring repeated single-character regions, the first single-character regions, the second single-character regions till the nth single-character regions are different from each other. Where "n" may be a predetermined value, such as 10. Alternatively, the number "n" may also be not an indefinite value. In order to divide all the single-character regions in the same line of the ID card photograph into the same group as possible, step 404 includes: acquiring all nth single-character regions whose distances are less than the first predetermined threshold from the (n−1)th single-character regions, until the (n+1)th single-character regions is failed to acquire. Wherein, the (n+1)th single-character regions are different from any one of the first single-character regions, the second single-character regions, and till the nth single-character regions.

Specifically, step 404 includes: acquiring all third single-character regions whose distances are less than the first predetermined threshold from the second single-character regions; acquiring all fourth single-character regions whose distances are less than the first predetermined threshold from the third single-character regions . . . until acquiring all nth single-character regions whose distances are less than the first predetermined threshold from (n−1)th single-character regions. In the process of implementing this step, because both the distances from the third single-character regions and the first single-character regions to the second single-character regions are smaller than the first predetermined threshold, the acquired third single-character regions may be repeated with the first single-character regions acquired previously. In the process of implementing step 304, in order to ensure that the currently obtained single-character region is different from all the previously obtained single-character regions, specifically.

Specifically, after the step of acquiring all the (m−1)th single-character regions whose distances are less than the first predetermined threshold from the (m−1)th single-character regions, it can be determined whether the newly acquired mth single-character region is repeated with any of the previously acquired single-character regions (including all the first single-character regions, the second single-character regions, and till the mth single-character regions); if yes, then the process will be terminated; if no, the next step will be performed: taking the newly obtained single-character region as the base (the mth single-character region), acquiring all the (m+1)th single-character regions whose distances are less than the first predetermined threshold from the base. Wherein, m is smaller than or equal to n−1.

Step 405, determine the first single-character region, the second single-character region, and till the nth single-character regions as a single-character region group.

Step 406, acquire the single-character region group with the greatest length. Specifically, the step includes: calculating the length of each single-character region group and screening out the single-character region groups with the greatest length.

The calculation of the length of the single-character region group includes: acquiring the length of the line segment connecting the first and the last single-character region in the single-character region group; determining the length of the connecting line segment as the length of the single-character region group. Wherein the step of acquiring the length of the line segment connecting the first and the last single-character regions in the single-character region group includes: acquiring the distance between any two single-character regions in the current single-character region group; screening out the greatest distance; determining the greatest distance as the length of the line segment connecting the first and the last single-character region in the current single-character region group. Further, the step of screening out the single-character region group with the greatest distance includes: screening out the greatest length from all the acquired connecting line segments and determining the single-character region group corresponding to the greatest length as the single-character region group with the greatest length.

Step 407, acquire the slant value of the line segment connecting the first and the last single-character region in the single-character region group with the greatest length; determine the slant value of the line segment as the correction value. Wherein, the connecting line segment is the one that uses the reference points of the first and the last single-character regions as the end points. The reference point is the geometric central point of a single-character region. The slant value of the connecting line segment can be acquired by obtaining the coordinates of the two endpoints of the connecting line segment. The slant value may be slant angle or slope. Because each of the characters is of different shapes, this may result in the geometric points of the extracted single-character regions not being on the same line at the same time. By acquiring the slant value of the line segment connecting the first and last single-character regions in the single-character region with the greatest length, the error can be minimized to close the actual slant value of the ID card photograph.

It should be understood that the order of the step number above does not indicate the order of execution. The order of execution of each process should be determined by their function and internal logic, and should not constitute any limitations on the implementation process of the embodiments of the present application.

The method for acquiring slant value of a slant image has been described above in details. Device for acquiring slant value of a slant image corresponding to the method above will be described as follows.

Figure 5:
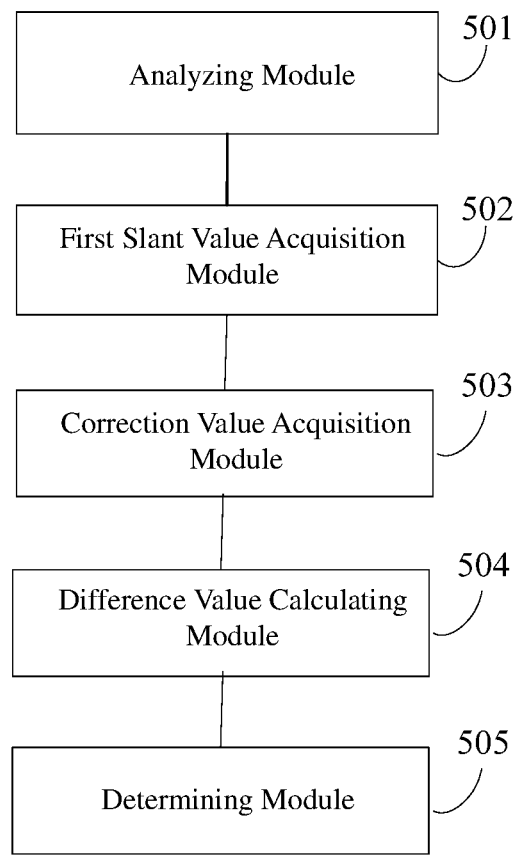
FIG. 5 illustrates a structural schematic of a device for acquiring slant value of a slant image according to an embodiment of the present application.

FIG. 5 illustrates a structural view of a device for acquiring slant value of a slant image according to an embodiment of the present application.

The device for acquiring slant value includes: an analyzing module 501, a first slant value acquisition module 502, a correction value acquisition module 503, a difference value calculating module 504 and a determining module 505.

The analyzing module 501 is configured to analyze the slant image and acquire coordinate information of a plurality of boundary lines of the slant image. The step specifically includes: performing binarization to the slant image to acquire a binary image; detecting the binary image based on Hough line segment detection algorithm to acquire the coordinate information of the plurality of boundary lines.

The first slant value acquisition module 502 is configured to analyze and calculate the coordinate information respectively and acquire the first slant values of each boundary lines. The first slant value may be slant angle or slope.

The correction value acquisition module 503 is configured to acquire a correction value. The method of obtaining the correction value has been described above, and will not be described here. Where the slant image includes a plurality of elements arranged sequentially, and the sorting direction of the plurality of elements is the same as the length direction or width direction of the slant rectangular image, the correction value acquisition module 503 includes an element extracting unit, an adjacent element determining unit, a second slant value acquisition unit and a correction value calculating unit.

The element extracting unit is configured to analyze the slant image and extract a plurality of element regions, wherein the element regions are affine invariant regions containing element(s). The adjacent elements determining unit is configured to determine two adjacent element regions. The second slant value acquisition unit is configured to acquire all second slant values, and the second slant values are the ones of straight lines connecting two adjacent element regions. The correction value calculating unit is configured to analyze and calculate all the second slant values to acquire the correction value.

The difference value calculating module 504 is configured to calculate the difference values between the first slant values and the correction value respectively.

The determining module 505 is configured to determine the first slant value corresponding to the minimum difference value as the slant value of the slant image.

In the embodiment of the present invention, the calibration value is obtained, then the first slant values of each of the extracted boundary lines are compared with the correction value one by one, and finally the first slant value corresponding to the minimum difference value is determined as the slant value of the slant image, thereby the slant value of the slant image is uniquely determined.

Further, the device for acquiring slant value for a slant image further includes a photograph acquisition module, a background eliminating module, a determining module and a setting module. The photograph acquisition module is configured to acquire a slant certificate photograph, wherein the photograph includes a background image and a slant image. The slant certificate may be an ID card, a social security card, a bank card or the like. The background eliminating module is configured to analyze the photograph, eliminate the background image to acquire the slant image. The determining module is configured to determine whether the slant image is larger than the slant certificate in size. The setting module is configured to set the slant image to be of the same size as the slant certificate where the slant image is larger than the slant certificate in size. Specifically, the analyzing module 501 is configured to analyze the slant image set by the setting module and acquire coordinate information of a plurality of boundary lines of the slant image.

The slant image is extracted from the photograph of the slant certificate, the size of the slant image may be different from the size of the slant certificate. And in the process of extracting the boundary lines, the larger the size of the slant image, the less easily the boundary lines are extracted. Therefore, in the embodiment of the present invention, where the size of the slant image is larger than the size of the slant certificate, the size of the slant image is set to be of the size of the slant certificate, so as to ensure that the slant image is not oversized, thereby the extraction of boundary lines would not be affected.

Some embodiments of the present application further provide a terminal including a memory, a processor, and a computer program stored in the memory and executable on the processor, wherein the method for acquiring slant value of a slant image described above is performed when the processor executes the computer program, Some embodiments of the present application provide a computer-readable storage medium comprising computer program, wherein the computer program is executed by a processor to perform the method for acquiring slant value of a slant image described above.

Those skilled in the art can understand all or part of the process of implementing the above methods, which can be completed by a computer program to instruct related hardware, and the program can be stored in a computer readable storage medium. The program, when executed, may include the flow of the embodiments of the methods described above. The storage medium may be a magnetic disk, an optical disk, a read-only memory (ROM), or a random access memory (RAM).

As described above, one or more embodiments are provided in combination with specific content, and the specific implementation of the present disclosure is not limited to the description. Any methods or structures that are, similar or approximate to the present disclosure, or any technical derivation or substitution based on the present disclosure, should be considered as the scope of the claims.

What is claimed is:

1. A method for acquiring slant value of a slant image, wherein the slant image is a rectangle; the method for acquiring slant value comprises:

analyzing the slant image and acquiring coordinate information of a plurality of boundary lines of the slant image;

acquiring first slant values of the boundary lines based on the coordinate information;

acquiring a correction value;

calculating difference values between the first slant values and the correction value respectively to acquire the minimum difference value;

determining the first slant value corresponding to the minimum difference value as the slant value of the slant image;

wherein the slant image includes a plurality of elements arranged sequentially, and the sorting direction of the elements is the same as the length direction or width direction of the slant image;

the acquiring a correction value includes:

analyzing the slant image and extracting a plurality of element regions, wherein the element regions are regions containing a single element;

determining the two adjacent element regions;

determining all second slant values, the second slant values are the values of the straight lines connecting the two adjacent element regions;

analyzing and calculating all the second slant values to acquire the correction value;

wherein analyzing and calculating all the second slant values to acquire the correction value includes:

clustering all the second slant values to acquire a plurality of slant value clusters;

acquiring the slant value cluster with the greatest weight;

calculating mean values of the slant value cluster with the greatest weight to acquire the correction value;

wherein clustering all the second slant values to acquire a plurality of slant value clusters includes:

acquiring a predetermined number;

clustering all third slant values to acquire the predetermined number of slant value clusters;

calculating the variances of each slant value clusters to acquire a minimum variance;

determining whether the minimum variance is smaller than the first predetermined threshold;

when the minimum variance value is greater than or equal to the first preset threshold, updating the predetermined number, and re-performing the step of clustering all third slant values to acquire the predetermined number of slant value clusters until the minimum variance is smaller than the first predetermined threshold.

2. The method for acquiring slant value of a slant image of claim 1, wherein the analyzing the slant image and acquiring coordinate information of a plurality of boundary lines of the slant image includes:
   performing binarization to the slant image to acquire a binary image;
   detecting the binary image based on Hough line segment detection algorithm to acquire the coordinate information of the plurality of boundary lines.

3. The method for acquiring slant value of a slant image of claim 1, wherein analyzing the slant image and extracting a plurality of element regions includes:
   analyzing the slant image and extracting all maximally stable extremal regions;
   filtering out non-element regions from all the maximally stable extremal regions to obtain a plurality of element regions.

4. The method for acquiring slant value of a slant image of claim 1, wherein before the analyzing the slant image and acquiring coordinate information of the plurality of boundary lines of the slant image, the method further includes:
   acquiring a slant certificate photograph, wherein the photograph includes background images and slant images;
   analyzing the photograph, eliminating the background image to acquire the slant image;
   determining whether the slant image is larger than the slant certificate in size;
   if the slant image is larger than the slant certificate in size, the slant image is set to be the same size as the slant certificate;
   if the slant image is smaller than or equal to the slant certificate in size, the size of the slant image will not be reset.

5. A terminal, comprising a memory, a processor, and a computer program stored in the memory and executable on the processor, wherein the processor executes the computer program to perform the follow steps:
   analyzing the slant image and acquiring coordinate information of a plurality of boundary lines of the slant image;
   acquiring first slant values of the boundary lines based on the coordinate information;
   acquiring a correction value;
   calculating difference values between the first slant values and the correction value respectively to acquire the minimum difference value;
   determining the first slant value corresponding to the minimum difference value as the slant value of the slant image;
   wherein the slant image includes a plurality of elements arranged sequentially, and the sorting direction of the elements is the same as the length direction or width direction of the slant image;
   the acquiring a correction value includes:
   analyzing the slant image and extracting a plurality of element regions, wherein the element regions are regions containing a single element;
   determining the two adjacent element regions;
   determining all second slant values, the second slant values are the values of the straight lines connecting the two adjacent element regions;
   analyzing and calculating all the second slant values to acquire the correction value;
   wherein analyzing and calculating all the second slant values to acquire the correction value includes:
   clustering all the second slant values to acquire a plurality of slant value clusters;
   acquiring the slant value cluster with the greatest weight;
   calculating mean values of the slant value cluster with the greatest weight to acquire the correction value;
   wherein clustering all the second slant values to acquire a plurality of slant value clusters includes:
   acquiring a predetermined number;
   clustering all third slant values to acquire the predetermined number of slant value clusters;
   calculating the variances of each slant value clusters to acquire a minimum variance;
   determining whether the minimum variance is smaller than the first predetermined threshold;
   when the minimum variance value is greater than or equal to the first preset threshold, updating the predetermined number, and re-performing the step of clustering all third slant values to acquire the predetermined number of slant value clusters until the minimum variance is smaller than the first predetermined threshold.

6. The terminal of claim 5, wherein the analyzing the slant image and acquiring coordinate information of a plurality of boundary lines of the slant image includes:
   performing binarization to the slant image to acquire a binary image;
   detecting the binary image based on Hough line segment detection algorithm to acquire coordinate information of the plurality of boundary lines.

7. The method for acquiring slant value of a slant image of claim 1, wherein the step of updating the predetermined number is:
   adding 1 to a current predetermined number value, to obtain a new value, and
   assigning the new value to the predetermined number.

8. The method for acquiring slant value of a slant image of claim 1, wherein the step of clustering all third slant values to acquire the predetermined number of slant value clusters includes:
   selecting a predetermined number of slant values randomly from all the slant value as initial clustering centers;
   for the remaining slant values, according to a similarity of the remaining slant values with the initial clustering centers, assigning the remaining slant values to the clusters represented by the initial clustering centers that are most similar to the remaining slant values.

9. The terminal of claim 5, wherein the step of updating the predetermined number is:
   adding 1 to a current predetermined number value, to obtain a new value, and
   assigning the new value to the predetermined number.

10. The terminal of claim 5, wherein the step of clustering all third slant values to acquire the predetermined number of slant value clusters includes:
    selecting a predetermined number of slant values randomly from all the slant value as initial clustering centers;
    for the remaining slant values, according to a similarity of the remaining slant values with the initial clustering centers, assigning the remaining slant values to the clusters represented by the initial clustering centers that are most similar to the remaining slant values.

* * * * *